United States Patent
Gupta et al.

(10) Patent No.: US 11,477,721 B2
(45) Date of Patent: Oct. 18, 2022

(54) METHODS AND APPARATUS FOR CONTROLLING TRANSMISSION OF A BASE STATION

(75) Inventors: Rajarshi Gupta, Santa Clara, CA (US); Fatih Ulupinar, San Diego, CA (US); Gavin B. Horn, La Jolla, CA (US); Parag A. Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/353,188

(22) Filed: Jan. 13, 2009

(65) Prior Publication Data

US 2009/0213825 A1    Aug. 27, 2009

Related U.S. Application Data (60) Provisional application No. 61/030,883, filed on Feb. 22, 2008.

(51) Int. Cl.
*H04L 12/28* (2006.01)
*H04W 48/02* (2009.01)
(Continued)

(52) U.S. Cl.
CPC ............ *H04W 48/02* (2013.01); *H04W 24/04* (2013.01); *H04W 92/12* (2013.01)

(58) Field of Classification Search
None
See application file for complete search history.

(56) References Cited

U.S. PATENT DOCUMENTS 5,457,680 A * 10/1995 Kamm .................... H04W 8/04
                                                                370/332
6,148,010 A * 11/2000 Sutton ..................... H04L 1/243
                                                                370/536
(Continued)

FOREIGN PATENT DOCUMENTS

EP      1467588 A2     10/2004
EP      2 056 628    * 10/2007
(Continued)

OTHER PUBLICATIONS

International Search Report & Written Opinion—PCT/US2009/034740, International Search Authority—European Patent Office—Jun. 12, 2009.
(Continued)

*Primary Examiner* — Christopher T Wyllie
(74) *Attorney, Agent, or Firm* — Qualcomm Incorporated (57) ABSTRACT

Methods and apparatus for controlling transmission of a base station, such as a Femto cell, based on the determined quality of a backhaul connection to a network are disclosed. In particular, a quality of a backhaul connection of a base station to a node in a communication network is determined. Based on this quality determination, transmission from the base station is either limited or stopped when the determined quality fails to meet a predefined condition. The degradation in quality of the backhaul connection, for example, affects the ability of the base station to offer sufficient service to access terminals. By limiting or stopping wireless transmission of the base station when the backhaul quality is degraded, access terminals either currently accessing the base station or attempting to connect to the base station can then more efficaciously hand off to another base station or access point.

56 Claims, 4 Drawing Sheets

(51) Int. Cl.
*H04W 24/04* (2009.01)
*H04W 92/12* (2009.01)

(56) References Cited

U.S. PATENT DOCUMENTS

| | | | | |
|---|---|---|---|---|
| 7,184,770 | B1* | 2/2007 | Narasimhan | H04W 16/18 455/67.11 |
| 7,626,932 | B2 | 12/2009 | Tuulos et al. | |
| 7,756,544 | B1* | 7/2010 | Graham | H04W 52/0258 713/340 |
| 7,835,272 | B1* | 11/2010 | Johnson | H04L 41/0668 370/228 |
| 7,853,264 | B1* | 12/2010 | Oh | H04B 7/15507 455/124 |
| 8,243,679 | B1* | 8/2012 | Huang | H04W 36/30 455/436 |
| 2001/0038648 | A1* | 11/2001 | Sutton et al. | 370/535 |
| 2001/0043539 | A1* | 11/2001 | Kuribayashi | G11B 7/00454 369/59.11 |
| 2002/0142772 | A1* | 10/2002 | Hunzinger | H04W 4/90 455/67.11 |
| 2003/0016627 | A1* | 1/2003 | MeLampy | H04L 29/06027 370/235 |
| 2003/0035393 | A1* | 2/2003 | Sinnarajah et al. | 370/335 |
| 2003/0035444 | A1* | 2/2003 | Zwack | H04J 3/0667 370/503 |
| 2003/0039216 | A1* | 2/2003 | Sheldon et al. | 370/260 |
| 2003/0121053 | A1* | 6/2003 | Honda | 725/107 |
| 2003/0147377 | A1* | 8/2003 | Saint Etienne | H04L 69/40 370/351 |
| 2003/0206524 | A1* | 11/2003 | Mohanty | H04L 1/0002 370/236 |
| 2004/0008619 | A1* | 1/2004 | Doshi | H04L 69/40 370/244 |
| 2004/0097237 | A1* | 5/2004 | Aoyama | H04B 7/18504 370/335 |
| 2004/0111652 | A1* | 6/2004 | Shoaib | H04L 41/0654 714/15 |
| 2004/0260834 | A1* | 12/2004 | Lindholm | H04L 45/02 709/238 |
| 2005/0048963 | A1* | 3/2005 | Kubler | H04W 16/06 455/448 |
| 2005/0078660 | A1* | 4/2005 | Wood | H04L 12/5692 370/352 |
| 2005/0105488 | A1 | 5/2005 | Raji et al. | |
| 2005/0124371 | A1* | 6/2005 | Harris | H04W 52/245 455/67.11 |
| 2005/0198363 | A1* | 9/2005 | Ling | H04W 36/0011 709/224 |
| 2005/0239513 | A1* | 10/2005 | Chang | H04Q 3/0016 455/567 |
| 2005/0271128 | A1* | 12/2005 | Williams | H04L 43/0817 375/222 |
| 2005/0288012 | A1* | 12/2005 | Morgan | H04W 88/14 455/13.2 |
| 2006/0013176 | A1* | 1/2006 | De Vos | H04W 36/14 370/338 |
| 2006/0059268 | A1* | 3/2006 | Victor | H04L 49/90 709/231 |
| 2006/0062151 | A1* | 3/2006 | Hagen | H04L 1/08 370/235 |
| 2006/0104200 | A1* | 5/2006 | Park | H04W 88/06 370/216 |
| 2006/0126509 | A1* | 6/2006 | Abi-Nassif et al. | 370/235 |
| 2006/0250953 | A1* | 11/2006 | Mooney | H04L 47/10 370/229 |
| 2006/0262737 | A1* | 11/2006 | Livet et al. | 370/254 |
| 2006/0268689 | A1* | 11/2006 | Tarraf et al. | 370/229 |
| 2007/0030809 | A1* | 2/2007 | Dayama | H04W 28/08 370/237 |
| 2007/0037581 | A1* | 2/2007 | Morita | H04W 28/02 455/453 |
| 2007/0115856 | A1* | 5/2007 | Schelen et al. | 370/254 |
| 2007/0155375 | A1* | 7/2007 | Kappel | H04W 24/04 455/422.1 |
| 2007/0177510 | A1* | 8/2007 | Natarajan et al. | 370/238 |
| 2007/0280176 | A1* | 12/2007 | Silverman | H04W 36/0055 370/338 |
| 2008/0025208 | A1* | 1/2008 | Chan | H04L 12/42 370/258 |
| 2008/0077357 | A1* | 3/2008 | Yamaguchi | G01R 31/31711 702/181 |
| 2008/0137537 | A1* | 6/2008 | Al-Manthari | H04W 72/1257 370/238 |
| 2008/0152104 | A1* | 6/2008 | Keeler | H04W 24/04 379/112.01 |
| 2008/0159183 | A1* | 7/2008 | Lindoff | H04L 1/1854 370/278 |
| 2008/0192629 | A1* | 8/2008 | Chari | 370/230 |
| 2008/0192692 | A1* | 8/2008 | Chari | H04L 47/31 370/331 |
| 2008/0212512 | A1* | 9/2008 | Harpek | H04B 7/18517 370/315 |
| 2008/0225737 | A1* | 9/2008 | Gong et al. | 370/252 |
| 2009/0067333 | A1* | 3/2009 | Ergen et al. | 370/235 |
| 2009/0190726 | A1* | 7/2009 | Yahyaoui | H04M 3/323 379/15.01 |
| 2009/0213730 | A1* | 8/2009 | Zeng | H04W 24/04 370/217 |
| 2009/0213825 | A1* | 8/2009 | Gupta | H04W 48/02 370/338 |
| 2011/0280171 | A1 | 11/2011 | Malkamaki | |
| 2013/0121132 | A1* | 5/2013 | Terry | H04W 24/08 370/216 |

FOREIGN PATENT DOCUMENTS

| | | |
|---|---|---|
| JP | 8214365 A | 8/1996 |
| JP | 2003283414 A | 10/2003 |
| JP | 2009536496 A | 10/2009 |
| JP | 2009260895 A | 11/2009 |
| JP | 2009544221 A | 12/2009 |
| RU | 2270526 C2 | 2/2006 |
| RU | 2292647 C2 | 1/2007 |
| WO | 02082666 A2 | 10/2002 |
| WO | 2004006515 A1 | 1/2004 |
| WO | WO-2004039006 A2 | 5/2004 |
| WO | WO-2004084509 A2 | 9/2004 |
| WO | WO06121399 | 11/2006 |
| WO | WO2007133022 A1 | 11/2007 |
| WO | WO2008008249 A2 | 1/2008 |

OTHER PUBLICATIONS

Taiwan Search Report—TW098105668—TIPO—Apr. 6, 2012.

* cited by examiner

METHODS AND APPARATUS FOR CONTROLLING TRANSMISSION OF A BASE STATION

CLAIM OF PRIORITY UNDER 35 U.S.C. § 119

The present Application for Patent claims priority to Provisional Application No. 61/030,883 entitled "Limiting Radio Frequency Radiation from a Base Station Based on Backhaul Connectivity" filed Feb. 22, 2008, and assigned to the assignee hereof and hereby expressly incorporated by reference herein.

BACKGROUND

Field

The present invention relates to methods and apparatus for controlling the transmission of a base station, and more particularly to methods and apparatus in a communication system that prevent or limit radio frequency (RF) transmission or radiation from a base station based on the quality of a backhaul connection of the base station.

Background

In addition to mobile phone networks currently in place, a new class of small base stations or access points (APs) has emerged. These base stations may be installed in a user's home, for example, and provide wireless coverage to mobile communication units (e.g., User equipment (UE) or access terminal (AT)) using a broadband Internet connection. Such personal miniature base stations are generally known as Home Node B (HNB), Home Base Station (HBS), Femto cells, or Pico cells. Instead of the wireless network normally serving the communication units (e.g., a wireless cellular network), these base stations may be installed in order to improve or boost service in a local area. By utilizing an Internet connection, such base stations may also afford lower cost mobile voice, video and data services to a user in that local area. Typically, such miniature base stations are connected to the Internet via a backhaul including a DSL modem or cable modem, as examples.

Backhauls for Internet access, such as a DSL connection, sometimes are unreliable. Thus, if a base station utilizing an internet connection experiences some degree of backhaul quality degradation or loss of a backhaul connection altogether, the base station nonetheless will continue to transmit or radiate RF. Accordingly, an AT currently using the base station for communication with a communication network will experience poor call quality of service or a dropped call. Furthermore, other ATs may sense the RF transmission from the base station and attempt to connect to the communication network via the base station, only to find no service or poor service, and in the process experience degrading call quality or a dropped call connection by attempting to use the base station.

SUMMARY

According to an aspect, a method for controlling transmission of a base station in a communication network is disclosed. The method includes determining a quality of a backhaul connection between the base station and at least one node within the communication network. The method also includes preventing transmission of at least one wireless signal from the base station when the determined quality fails to meet a predefined condition.

According to another aspect, an apparatus for controlling transmission of a base station is disclosed. The apparatus includes a memory storing instructions executable by a processor. The apparatus also includes at least one processor configured to execute the instructions stored in the memory to determine a quality of a backhaul connection between the base station and at least one node within the communication network. The at least one processor is also configured to prevent transmission of at least one wireless signal from the base station when the determined quality fails to meet a predefined condition.

According to still another aspect, an apparatus for use in a communication system is disclosed. The apparatus includes means for determining a quality of a backhaul connection between the base station and at least one node within the communication network. The apparatus also includes means for preventing transmission of at least one wireless signal from the base station when the determined quality fails to meet a predefined condition.

In still one further aspect, a computer program product for use in a base station for controlling transmissions of the base station is disclosed. The computer program product comprises a computer-readable medium including code for causing a computer to determine a quality of a backhaul connection between the base station and at least one node within the communication network. The computer program product also includes code for causing a computer to prevent transmission of at least one wireless signal from the base station when the determined quality fails to meet a predefined condition.

DETAILED DESCRIPTION

The word "exemplary" is used herein to mean "serving as an example, instance, or illustration." Any embodiment described herein as "exemplary" is not necessarily to be construed as preferred or advantageous over other embodiments. The disclosed embodiments may be applied to any one or combinations of the following technologies: Code Division Multiple Access (CDMA) systems, Multiple-Carrier CDMA (MC¬CDMA), Wideband CDMA (W-CDMA), High-Speed Packet Access (HSPA, HSPA+), Time Division Multiple Access (TDMA) systems, Frequency Division Multiple Access (FDMA) systems, Orthogonal Frequency Division Multiple Access (OFDMA) systems, Ultra Mobile Broadband (UMB), Long Term Evolution (LTE) or other multiple access techniques. A wireless communication system may be designed to implement one or more standards, such as IS-95, cdma2000, IS-856, W-CDMA, TD¬SCDMA, and other standards.

The present disclosure provides apparatus and methods for controlling the transmission of wireless signals (i.e., RF transmission) to ATs from a base station or AP, such as local base stations including Femto cells and Pico cells. The control of the wireless signal transmissions is based on or dependent upon a determined quality of a backhaul connection between the base station and other nodes within a larger communication system (e.g., either in the backhaul or operator network). In an aspect, the measurement of packet connectivity of packet transmission between the base station and other nodes in the communication system affords an assessment of whether the base station may sufficiently effect communication for ATs in communication with the base station, as backhaul packet connectivity is not always reliable, as discussed previously. Accordingly, if the quality of the packet connectivity between nodes over the backhaul is degraded or nonexistent, the present apparatus and methods limit or cease transmission of wireless signals from a local base station to allow ATs in range to either connection to another local base station or a conventional macro base station for service.

Figure 1:
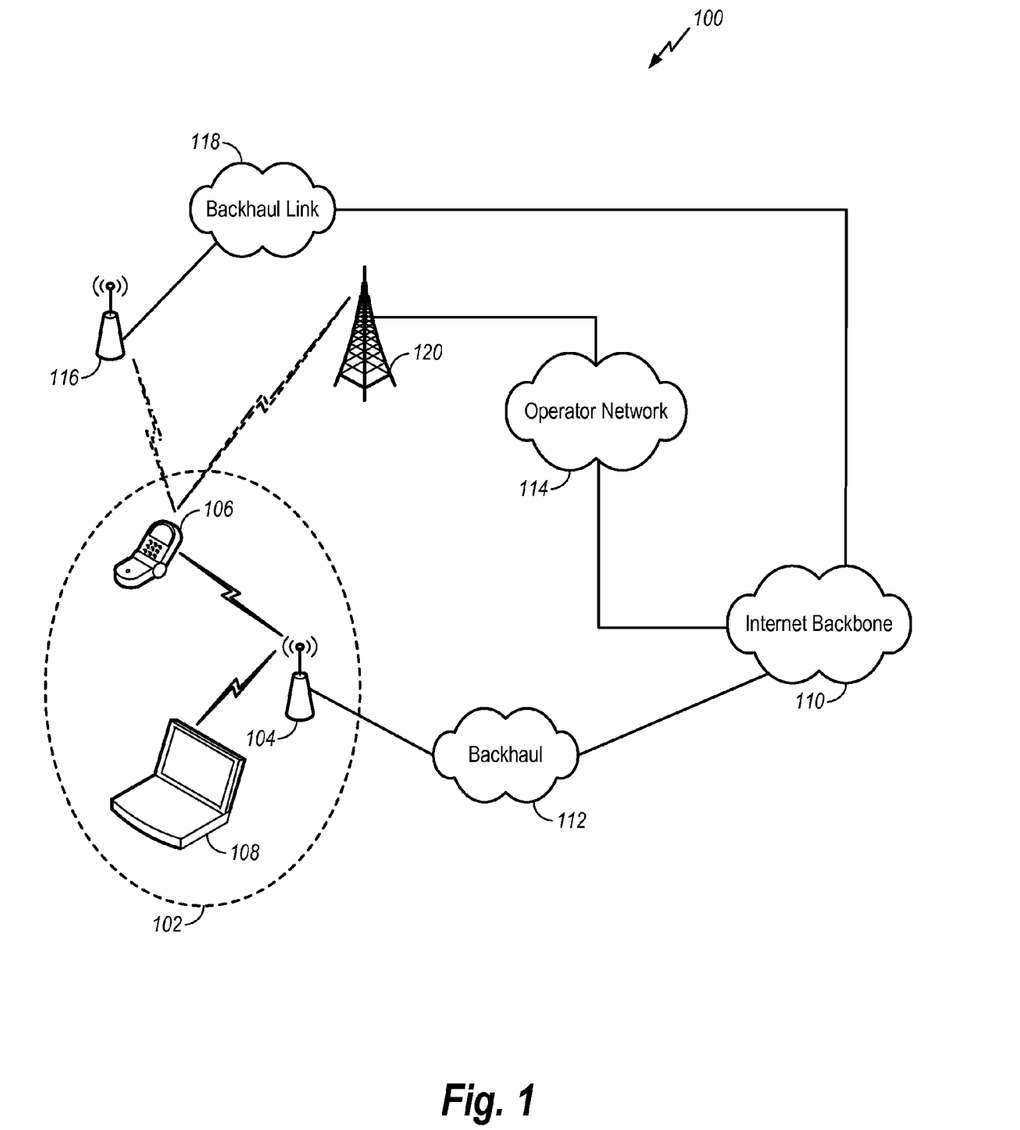
FIG. 1 illustrates an exemplary wireless communication system in which various disclosed aspects may be implemented.

FIG. 1 illustrates an exemplary wireless communication system 100 configured to support a number of users, in which various disclosed aspects may be implemented. As shown in FIG. 1, system 100 provides communication for multiple cells or sectors, such as cell 102 (which could also be considered a sector as another example). A base station or access point (AP) 104 communicates with one or more mobile devices or access terminals (ATs), which may also be interchangeably referred to as user equipment (UE). As examples, the ATs may include a mobile phone 106, a computer 108, or any other device configured to communication wirelessly with the AP 104.

As an example, the AP 104 in FIG. 1 may be a Femto cell base station, Home Node B unit (HNBs), or other similar device that effects a small scale or local area network environment, such as, for example, in one or more user residences, and being configured to serve associated, as well as alien, user equipment (UE). In such an implementation, the AP 104 is further coupled to the Internet or IP network 110 via a backhaul 112, which may comprise one or more devices or nodes (not shown). The devices or nodes may consist of one or more of a DSL router (not shown) or cable modem (not shown), as well as associated coupling and termination connection to the IP network 110 (not shown) such as a gateway (e.g., a Femto Gateway, a Pico Gateway, an Access Gateway), or a mobility manager. The internet network 110 is then connected to an operator network 114, which may be in communication with a plurality of other APs (e.g., AP 116) via an associated backhaul (e.g., 118), or macro area base stations (e.g., base station 120). The AT 106, for example, may also communicate with another local AP 116 or macro area base station 120, when handing off or service is not available from AP 104.

It is further noted that AP 116 may be considered a guest or alien local AP, such as a Femto cell. In such case, a guest Femto cell refers to a base station on which an AT UE 106 or 108 is temporarily authorized to operate on, and an alien Femto cell is a base station on which the AT is not authorized to operate on. In one embodiment, a local area AP 104 may be deployed on a single frequency or, in the alternative, on multiple frequencies, which may overlap with frequencies of other local cell frequencies or macro cell frequencies.

It is also noted in the example of an AP (e.g., AP 104) comprising a Femto cell or node, an owner of the Femto node may subscribe to a mobile service, such as, for example, a 3G mobile service offered through the operator core network 114. In addition, ATs 108 or 110 may be capable of operating both in macro environments and in smaller scale (e.g., residential) network environments dependent on location. In other words, an AT may be served by a macro AP 120 or by any one of a number of Femto nodes (e.g., 104 and 116) within a corresponding user residence or area. For example, when a subscriber is outside his home, he is served by a standard macro AP (e.g., 120) and when the subscriber is at home, he is served by a Femto node (e.g., AP 104). It should be appreciated that a Femto node (e.g., AP 104) may be backward compatible with existing access terminals (e.g., 106 or 108).

From a restricted Femto node perspective, a home access terminal may refer to an access terminal that is authorized to access the restricted Femto node. A guest access terminal may refer to an access terminal with temporary access to the restricted Femto node. An alien access terminal may refer to an access terminal that does not have permission to access the restricted Femto node, except for perhaps emergency situations, for example, such as 911 calls (e.g., an AT that does not have the credentials or permission to register with the restricted Femto node).

For convenience, the disclosure herein describes various functionalities in the context of a Femto cell or node. It should be appreciated, however, that a Pico cell or node may provide the same or similar functionality for a larger coverage area. For example, a Pico node may be restricted; a home Pico node may be defined for a given AT; and so on.

Although the examples described herein use 3GPP terminology, it is to be understood that the embodiments may be applied to 3GPP (Re199, Re15, Re16, Re17) technology, as well as, 3GPP2 (IxRTT, 1xEV-DO ROO, RevA, RevB) technology and other known and related technologies, such as, for example UMB (Rev B, Advanced) or Long Term Evolution (LTE). In such embodiments described herein, the owner of the local AP 104, for example, subscribes to mobile service, such as, for example, 3G mobile service, offered through the mobile operator core network 114, and the AT 106 is capable to operate both in macro cellular environment and in small scale local network environment.

In an aspect, the network of the example in FIG. 1 may include a large number of local area networks or cells (e.g., cell 102), in addition to macro base stations (e.g., 120). As was discussed previously, local area APs, such as Femto nodes or cells (e.g., APs 104 or 116), are end-user devices connected through a backhaul and internet connection (e.g. 110, 112) to the operator's network (e.g., 114). As such, their backhaul connectivity may be unreliable. At times, when a local AP (e.g., 104) has lost its backhaul packet connectivity, it may be unable to serve any ATs. In addition, any packets that an AT (e.g., 106) sends to the local AP (e.g., 104) may be lost due to poor or nonexistent packet connectivity of the local AP's backhaul. Hence, it would be advantageous to prevent or limit local ATs connection to a local AP that has either a degraded connectivity where packet connectivity is insufficient or in an extreme case, has lost backhaul connectivity altogether.

According to an aspect, a local area base station, such as a Femto cell, relies on its backhaul to maintain packet connectivity (e.g., IP connectivity) to the operator's network. As such, the Femto cell may periodically carry out a process or mechanism (e.g., a keep alive mechanism) to ensure that its packet connectivity to one or more nodes in the backhaul or nodes in the communication network, in general, are intact. If the packet connectivity is either lost or the backhaul packet transmission quality is degraded in some manner, the present disclosure includes limiting or preventing radiation of a wireless signal from the base station. This cessation or limitation will prevent or limit ATs connecting wirelessly to the base station, allowing the AT to more quickly connect to another local area base station or a macro area base station.

Figure 2:
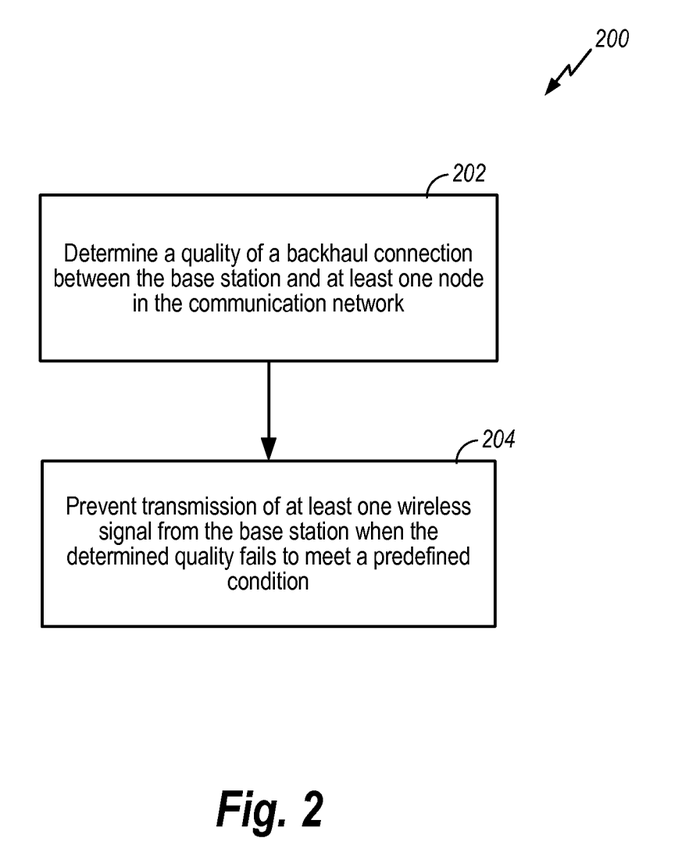
FIG. 2 is illustrates a flow diagram of an exemplary method for controlling the transmission of a base station in a communication system.

Accordingly, FIG. 2 illustrates a flow diagram of an exemplary method 200 for controlling the transmission of a base station in a communication system based on the quality of backhaul packet connectivity. Method 200 includes a block 202 where a quality of a backhaul connection between the base station to a node in a communication network is determined. According to an aspect, the determination the quality of the backhaul connection may include one or more of determining whether or not packet connectivity between the base station and a node of the backhaul connection is extant, determining the throughput packet capacity of the backhaul connection, determining communication packet latency of the backhaul, or determining a level of backhaul jitter. Most obviously if packet connectivity between the base station and a node of the backhaul is not present, then quality is nonexistent. Nonetheless, any of the other factors listed may also adversely affect the quality of the packet connectivity of the backhaul to such degree that it is advisable to limit wireless connection between the base station and ATs in range of the base station. These factors become particularly important when a base station, such as a Femto cell, is expected to ensure some quality of service (QoS) for ATs it serves.

The determination of the quality of the backhaul connection of the base station to nodes in the communication system (e.g., nodes or devices in the backhaul) is not limited to merely a physical connectivity. That is, the measure of connectivity is qualitative in nature to measure the quality of packet connectivity between nodes. This measure determines whether data packets transmitted between nodes are sent and received with sufficient quality to ensure proper communication of the information contained in the packets (e.g., IP connectivity) between nodes. In the presently disclosed apparatus and methods, this packet connectivity between a local base station and nodes in the network is used for making the decision to limit or cease RF radiation from a local base station.

It is noted that determination of the quality of the packet connectivity of the backhaul connection may be initiated the base station or AP or by other elements or nodes in the backhaul connection or operator network, such as, but not limited to, a Femto gateway, a Pico Gateway, an access gateway or an authentication, authorization and accounting (AAA) server. It is noted that all of these listed elements are not explicitly shown in the figures, but these elements or nodes are known components of either the backhaul 112 or the operator network 114. This function may be also termed a "keepalive" operation that periodically determines the quality of the packet connectivity for purposes of determining if the quality is sufficient for continued serving of ATs by the base station. Furthermore, the backhaul quality determination may be carried out between the base station and nodes or elements of the backhaul or operator network designated for use in determining the backhaul quality, such as any of the elements in the immediately preceding list, as examples.

In a particular example, if the backhaul nodes or elements are employed to initiate the quality determination or keepalive function, a Femto cell can expect to receive a packet periodically at predetermined time periods, for example. If the packet or packets are not received, the Femto cell may deem the backhaul packet connectivity dead. Alternatively, if the quality measure of the packets received fails to meet a predefined threshold or standard, the packet connectivity may be deemed insufficient for continued communication.

As mentioned previously, the quality determination or keepalive function may be initiated periodically either by the Femto base station or nodes within the backhaul. Alternatively, a quality determination may be initiated by the base station each time a new AT wants to connect to the base station, thus ensuring that every new AT connection is performed based on the most current backhaul quality information. In still a further alternative, the quality determination may be performed with each power up of the AP.

It is noted that the communication network referred to in block 202 may consist of any or all nodes in the operator network 114, a gateway connection from the backhaul to an internet backbone 110, a portion (i.e., particular nodes) of the backhaul 112, or combinations thereof.

Referring again to FIG. 2, after the quality determination from the processes of block 202 is complete, flow proceeds to block 204. In block 204, transmission of at least one wireless (RF transmission) signal from the base station is prevented when the determined quality fails to meet a predefined condition. In one example, the predefined condition may be backhaul connectivity. Thus, if there is no backhaul connectivity, the base station may simply stop radiating some or all RF signals. Cessation of RF transmission would ensure that no AT will connect to the base station. It is also noted that by ceasing RF transmission, any ATs currently connected to the base station can thereby be forced to hand off to alternate base station. For example, the AP 104 in FIG. 1 would stop transmitting or radiating RF signals to AT 106. As a result, the AT 106 would hand off to local AP 116 or macro AP 120, as examples. Alternatively, it is contemplated that merely a portion of the signals from the base stations will be prevented, such as those related to data transmission to the operator network, while maintaining others, such as signaling related to communication solely between the AT and base station. For instance, it is contemplated in one example that a base station (e.g., a Femto cell) might send out some information used by the AT to perform positioning, as an example. In such case, that information may still be sent by the base station even if the backhaul is down.

Although not shown in FIG. 2, it is noted that the determination of whether the quality of the backhaul connection fails to meets the predefined condition may be continuously or periodically by comparing the determined quality to the one or more predefined conditions. As discussed above, the quality determinations may include connectivity of the backhaul, the throughput of the backhaul, the latency of packets transmitted over the backhaul, or jitter on the backhaul. Accordingly, the predefined conditions may include connectivity of the backhaul to at least one portion of the communication network. Thus, if the connectivity of the backhaul is gone, this determined qualitative measure or condition will not be met and transmission of RF signals prevented. Another predefined condition may be a predetermined level of throughput of the backhaul connection, which would indicate that a particular or requisite bandwidth is available. If the level of throughput is not met, then the base station may prevent transmission or limit transmission to in range ATs.

Still a further predetermined condition is whether the latency of packets over the backhaul is below a predetermined time or latency threshold. If not, this would indicate that the backhaul connection may be too slow for certain communication or data services and that an AT would be better served by handing off to another base station. Yet a further predetermined condition may include a level of backhaul jitter is below a jitter threshold. Excessive jitter on the backhaul connection engenders degradation in the backhaul quality. Accordingly, if the determined quality indicates that the jitter is below the predetermined condition or jitter threshold, again it may be desirable for the AT to hand off to an alternate base station.

Figure 3:
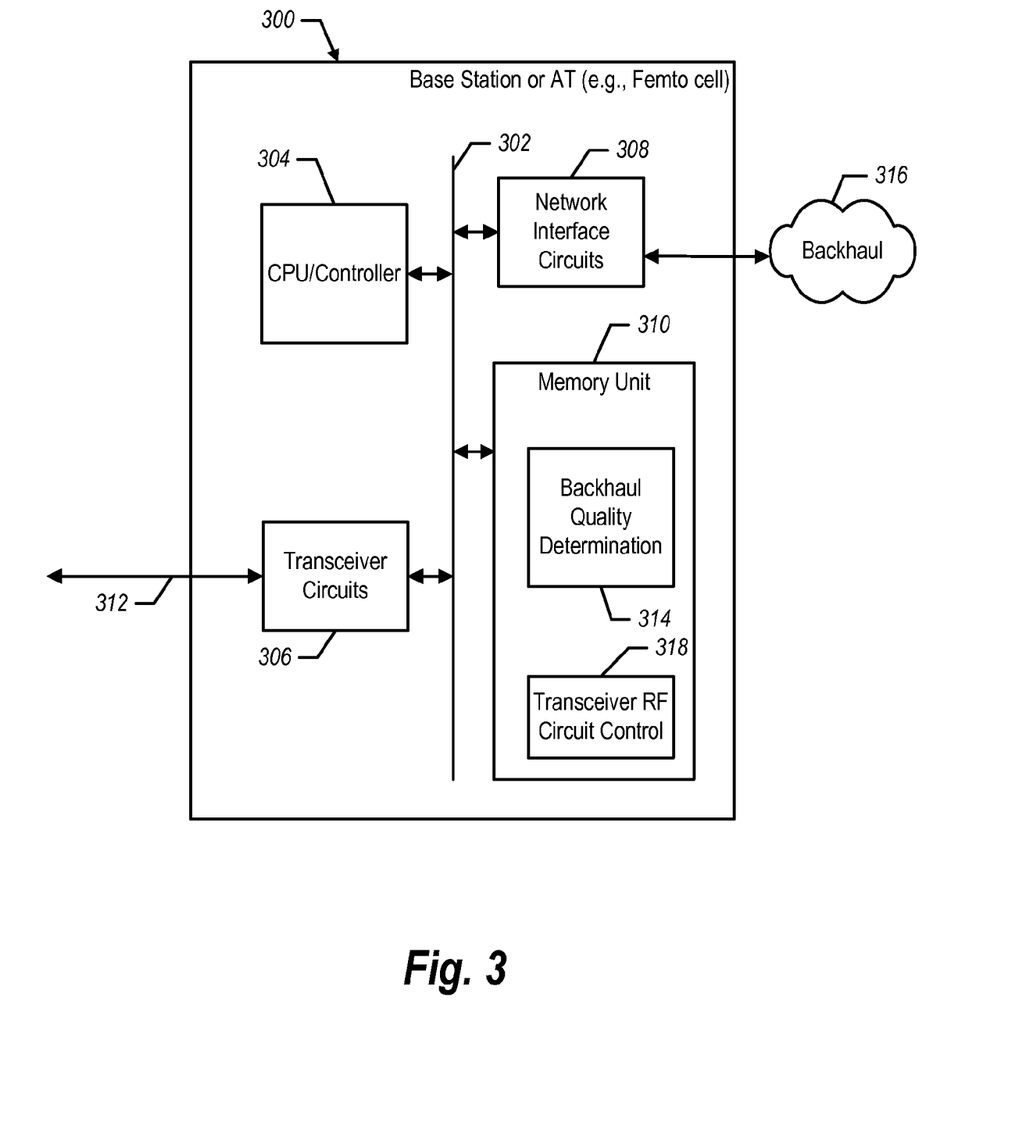
FIG. 3 is an exemplary implementation of a base station including apparatus for controlling transmission of the base station in a communication system.

FIG. 3 schematically shows an exemplary implementation of an apparatus 300 for executing the methodologies as described above. Apparatus 300 may be implemented in a base station, such as base station 104 in FIG. 1 implemented by a Femto cell, as merely an example, or any other suitable apparatus. The apparatus 300 features a central data bus 302, or similar device for linking several circuits together. The circuits include a CPU (Central Processing Unit) or a controller 304, transceiver circuits 306, network interface circuits 308, and a memory unit 310.

The transceiver circuits 306 include receiver circuits to process received signals before sending out to the central data bus 302, as well as transmit circuits to process and buffer data from the data bus 302 before sending out of the device 300, such as to an AT 106 as illustrated in FIG. 1. In the case where apparatus 300 is employed as a base station, the transceiver circuits 306 may include RF circuits to transmit over a wireless link 312 to one or more AT's (e.g., AT 106 or AT 108).

The CPU/controller 304 performs the function of data management of the data bus 302 and further the function of general data processing, including executing the instructional contents of the memory unit 310. It is noted here that instead of separately implemented as shown in FIG. 3, as an alternative, the transceiver circuits 306 can be incorporated as parts of the CPU/controller 304. As a further alternative, the entire apparatus 300 may be implemented as an application specific integrated circuit (ASIC) or similar apparatus.

The memory unit 310 may include one or more sets of instructions/modules. In the exemplary apparatus 300, the instructions/modules include, among other things, a backhaul quality determination module or function 314, which is configured to effect the methodologies described herein (e.g., the processes of block 202 in FIG. 2). As an example, module 314 may derive backhaul quality information from the network interface circuits 308, which are communicatively coupled to the backhaul 316. As described previously, the quality determination may be initiated by apparatus 300, or alternatively may receive backhaul quality information from other elements in the communication network via interface circuits 308.

Memory unit 310 may further include a Transceiver RF Circuit Control unit 318 or similar data construct that prevents, limits, or turns off at least a portion of the wireless (RF) signals transmitted or radiated by transceiver circuits 306 based on the quality determination of functional module 314. As discussed before, if the quality of the backhaul does not meet a predetermined condition as discussed in connection with block 204 of FIG. 2, either the RF transmission can be halted or at least limited in some respect.

In the example of FIG. 3, the memory unit 310 may be a RAM (Random Access Memory) circuit. The exemplary portions, such as the functions 314 and 318, are software routines, modules and/or data sets. The memory unit 310 can be tied to another memory circuit (not shown) which either can be of the volatile or nonvolatile type. As an alternative, the memory unit 310 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and other computer-readable media well known in the art.

Figure 4:
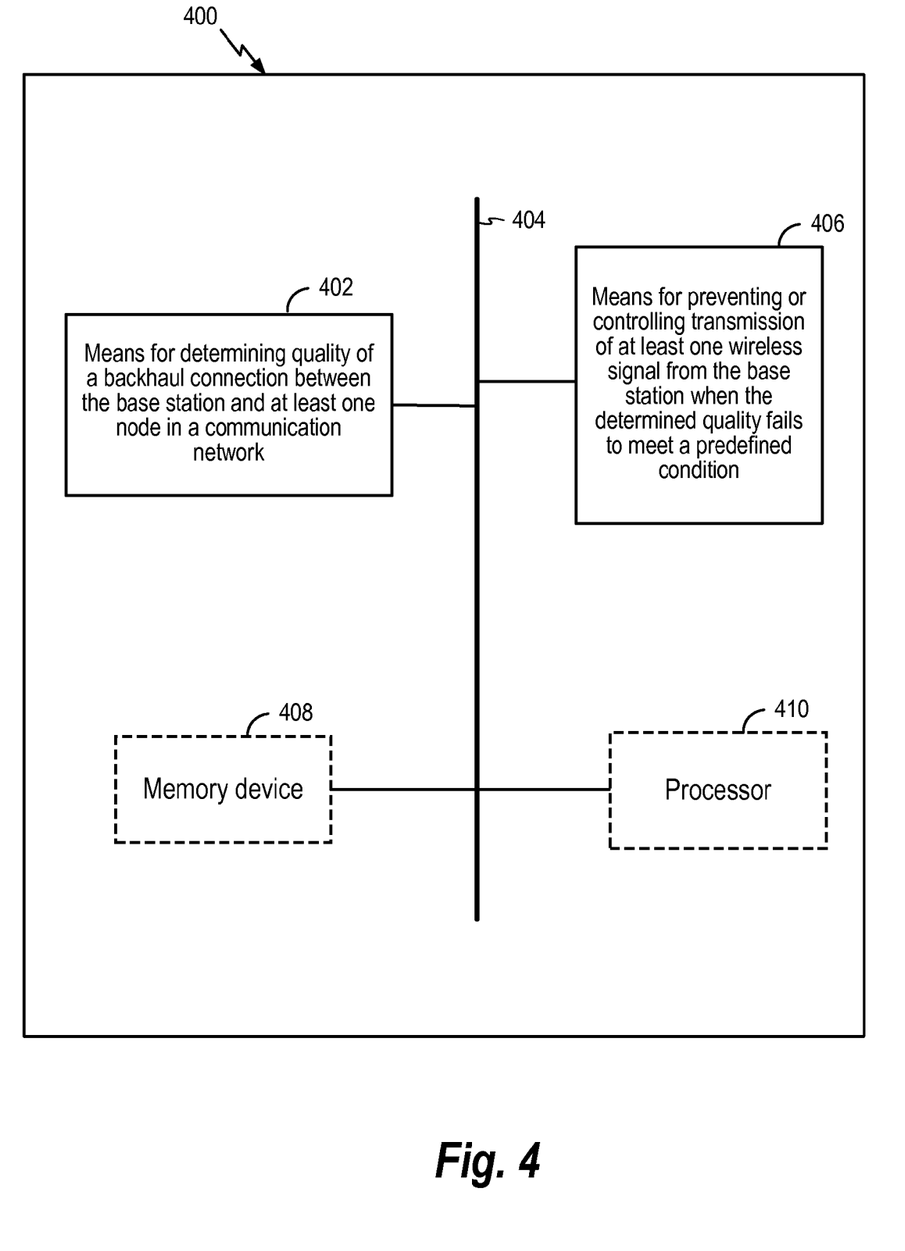
FIG. 4 is still another exemplary apparatus that may be utilized for controlling transmission of the base station in a communication system.

FIG. 4 illustrates another apparatus 400 for use in a communication system that may be utilized for controlling the transmission of a base station based on backhaul quality. The apparatus 400, which may be implemented in a base station, for example, includes a module or means 402 for determining the quality of a backhaul connection between a base station and a node in the communication network, such as the nodes in the backhaul 112, or alternatively the operator network 114, as examples, but not limited thereto. The functionality of means 402 is similar to the functions described above in connection with block 202 in FIG. 2, and means 402 may be implemented with memory unit 314 and a processor 304, as an example.

The backhaul quality determined by means 402 may then be communicated to various other modules or means in apparatus 400 via a bus 404, or similar suitable communication coupling. In particular, the quality determination of the backhaul is communicated to means 406 for preventing or controlling transmission of at least one wireless signal from the base station when the determined quality fails to meet a predefined condition. It is noted that the comparison of whether the determined backhaul quality does not meet the predefined conditions may be performed by means 406, but alternatively could be performed by means 402 and the resultant decision communicated to means 406. The functionality of means 406 is similar to the functions described above in connection with block 204 in FIG. 2. Additionally, means 406 may control the RF transmission of a transceiver portion of the base station, such as transceiver circuits 306 in FIG. 3, as an example. Means 406 may be effected by memory unit storing instructions, such as unit 314 in FIG. 3, which are executed by a processor (e.g., controller 304 in FIG. 3) to control a receiver portion of a transceiver (e.g., transceiver circuits 306), as merely one example.

Apparatus 400 may also include an optional computer readable medium or memory device 408 configured to store computer readable instructions and data for effecting the processes and behavior of either the modules. Additionally, apparatus 400 may include a processor 410 to execute the computer readable instructions in memory 408, and may be configured to execute one or more functions of the various modules in apparatus 400.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The word "exemplary" is used herein to mean "serving as an example, instance, or illustration." Any embodiment described herein as "exemplary" is not necessarily to be construed as preferred or advantageous over other embodiments. The disclosed examples may be applied to any one or combinations of the following technologies: Code Division Multiple Access (CDMA) systems, Multiple-Carrier CDMA (MC¬CDMA), Wideband CDMA (W-CDMA), High-Speed Packet Access (HSPA, HSPA+), Time Division Multiple Access (TDMA) systems, Frequency Division Multiple Access (FDMA) systems, Orthogonal Frequency Division Multiple Access (OFDMA) systems, Ultra Mobile Broadband (UMB), Long Term Evolution (LTE) or other multiple access techniques. A wireless communication system may be designed to implement one or more standards, such as IS-95, cdma2000, IS-856, W-CDMA, TD¬SCDMA, and other standards.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. Accordingly, the novel aspects described herein are to be defined solely by the scope of the following claims.

What is claimed is:

1. A method by a base station in a communication network for controlling transmission, comprising: determining a quality of a backhaul connection between the base station and at least one node; and preventing transmission of all wireless signals from the base station, with the base station powered on, when the determined quality fails to meet a predefined condition wherein the determination of the quality of the backhaul connection is performed upon power up of the base station.

2. The method as defined in claim 1, wherein the determination of the quality of the backhaul connection is initiated by at least one of the base station and the at least one node.

3. The method of claim 1, wherein the at least one node comprises at least one of a Femto Gateway, a Pico Gateway, an Access Gateway, a mobility manager, or an authentication, authorization, and accounting (AAA) server.

4. The method as defined in claim 1, wherein the determination of the quality of the backhaul connection is performed periodically.

5. The method of claim 1, wherein the determination of the quality of the backhaul connection is performed in response to a wireless communication device requesting access to the base station.

6. The method as defined in claim 1, wherein the base station comprises an end user device configured to communicate with a wireless communication device using a cellular technology.

7. The method of claim 1, wherein the base station is a Femto cell or a home Node B.

8. An apparatus for controlling transmission of a base station, wherein the apparatus comprises: at least one processor coupled with a memory and configured to: determine a quality of a backhaul connection between the base station and at least one node; and prevent transmission of all wireless signals from the base station, with the base station powered on, when the determined quality fails to meet a predefined condition wherein the at least one processor is configured to determine the quality of the backhaul connection upon powerup of the base station.

9. The apparatus of claim 8, wherein the determination of the quality of the backhaul connection is initiated by the base station or the at least one node.

10. The apparatus of claim 8, wherein the at least one node comprises at least one: of a Femto Gateway, a Pico Gateway, an Access Gateway, a mobility manager, or an authentication, authorization, and accounting (AAA) server.

11. The apparatus as defined in claim 8, wherein the at least one processor is configured to determine of the quality of the backhaul connection periodically.

12. The apparatus of claim 8, wherein at least one processor is configured to determine the quality of the backhaul connection in response to a wireless communication device requesting access to the base station.

13. The apparatus as defined in claim 8, wherein the base station comprises an end user device configured to communicate with a communication device using a cellular technology.

14. The apparatus of claim 8, wherein the base station is a Femto cell or a home Node B.

15. An apparatus in a communication system comprising: means for deterermining a quality of a backhaul connection between a base station and at least one node; and means for preventing transmission of all wireless signals from the base station, with the base station powered on, when the determined quality fails to meet a predefined condition wherein the determination of the quality of the backhaul connection is performed upon power up of the base station.

16. The apparatus as defined in claim 15, wherein the determination of the quality of the backhaul connection is initiated by one of the base station or the at least one node.

17. The apparatus of claim 15, wherein the at least one node comprises at least one of: a Femto Gateway, a Pico Gateway, an Access Gateway, a mobility manager, or an authentication, authorization, and accounting (AAA) server.

18. The apparatus as defined in claim 15, wherein the determination of the quality of the backhaul connection is performed periodically.

19. The apparatus as defined in claim 15, wherein the determination of quality of the backhaul connection is performed whenever a wireless communication device requesting access to the base station.

20. The apparatus as defined in claim 17, wherein the base station comprises an end user device configured to communicate with a wireless communication device using a cellular technology.

21. The apparatus of claim 15, wherein the base station is a Femto cell or a home Node B.

22. A non-transitory computer readable medium having computer executable code stored thereon for controlling transmissions of a base station comprising code for determinining a quality of a backhaul connection between the base station and at least one node; and code for preventing transmission of all wireless signals from the base station, with the base station powered on, when the determined quality fails to meet a predefined condition wherein the determination of the quality of the backhaul connection is performed upon power up of the base station.

23. The non-transitory computer readable medium of claim 22, wherein the determination of the quality of the backhaul connection is initiated in the base station or the at least one node.

24. The non-transitory computer readable medium of claim 22, wherein the at least one node comprises at least one of: a Femto Gateway, a Pico Gateway, an Access Gateway, a mobility manager, or an authentication, authorization, and accounting (AAA) server.

25. The non-transitory computer readable medium of claim 22, wherein the determination of the quality of the backhaul connection is performed periodically.

26. The non-transitory computer readable medium of claim 22, wherein the determination of quality of the backhaul connection is performed in response to a wireless communication device requesting access to the base station.

27. The non-transitory computer readable medium of claim 22, wherein the base station comprises an end user device configured to communicate with a wireless communication device using a cellular technology.

28. The non-transitory computer readable medium of claim 22, wherein the base station is a Femto cell or a home Node B.

29. A method by a home Node B(HNB) in a communication network for controlling transmission comprising: determining a quality of a backhaul connection, to an operator network, between the HN B and at least one node; and preventing transmission of all wireless signals from the HNB, with the HNB powered on, when the determined quality fails to meet a predefined condition wherein determining the quality of the backhaul connection is performed upon power up of the HNB.

30. The method of claim 29, wherein determining the quality of the backhaul connection is initiated by at least one of: the HNB or the at least one node.

31. The method of claim 29, wherein the at least one node comprises at least one of: a Femto Gateway, a Pico Gateway, an Access Gateway, a mobility manager, or an authentication, authorization, and accounting (AAA) server.

32. The method of claim 29, wherein determining the quality of the backhaul connection is performed periodically via a keep alive mechanism.

33. The method of claim 29, wherein determining the quality of the backhaul connection is performed in response to a wireless communication device requesting access to the HNB.

34. The method of claim 29, wherein the HNB comprises an end user device configured to communicate with a wireless communication device using a cellular technology.

35. The method of claim 29 further comprising communicating the quality of the backhaul connection to other nodes.

36. An apparatus for controlling transmission ofa home Node B(HNB), comprising: at least one processorcoupled with a memory and configured to: determine a quality of a backhaul connection, to an operator network, between the HNB and at least one node; and prevent transmission of all wireless signals from the HNB, with the HNB powered on, when the determined quality fails to meet a predefined condition wherein the at least one processor is configured to determine the quality of the backhaul connection upon power up of the HNB.

37. The apparatus of claim 36, wherein the determination of the quality of the backhaul connection is initiated by the HNB or the at least one node.

38. The apparatus of claim 36, wherein the at least one node comprises at least one of: a Femto Gateway, a Pico Gateway, an Access Gateway, a mobility manager, or an authentication, authorization, and accounting (AAA) server.

39. The apparatus of claim 36, wherein the at least one processor is configured to determine of the quality of the backhaul connection periodically via a keep alive mechanism.

40. The apparatus of claim 36, wherein at least one processor is configured to determine the quality of the backhaul connection in response to a wireless communication device requesting access to the HNB.

41. The apparatus of claim 36, wherein the HNB comprises an end user device configured to communicate with a communication device using a cellular technology.

42. The apparatus of claim 36 wherein the at least one processor is further configured to communicate the quality of the backhaul connection to other nodes.

43. An apparatus foruse in a communication system comprising: means for determining a quality of a backhaul connection, to an operator network, between a home Node B(HNB) and at least one node; and means for preventing transmission of all wireless signals from the HNB, with the HNB powered on, when the determined quality fails to meet a predefined condition wherein the means for determining the quality of the backhaul connection is performed upon power up of the HNB.

44. The apparatus of claim 43, wherein the means for determining the quality of the backhaul connection is initiated by the HNB or the at least one node.

45. The apparatus of claim 43, wherein the at least one node comprises at least one of: a Femto Gateway, a Pico Gateway, an Access Gateway, a mobility manager, or an authentication, authorization, and accounting (AAA) server.

46. The apparatus of claim 43, wherein the means for determining the quality of the backhaul connection is performed periodically via a keep alive mechanism.

47. The apparatus of claim 43, wherein the means for determining the quality of the backhaul connection is performed in response to a wireless communication device requesting access to the HNB.

48. The apparatus of claim 43, wherein the HNB comprises an end user device configured to communicate with a wireless communication device using a cellular technology.

49. The apparatus of claim 43 further comprising means for communicating the quality of the backhaul connection to other nodes.

50. A non-transitory computer readable medium having computer executable code stored thereon for controlling transmissions of a home Node B (HNB), comprising: code for determining a quality of a backhaul connection, to an operator network, between the HNB and at least one node; and code for preventingtransmission of all wireless signals from the HNB, with the HNB powered on, when the determined quality fails to meet a predefined condition wherein the determination of the quality of the backhaul connection is performed upon power up of the HNB.

51. The non-transitory computer readable medium of claim 50, wherein the determination of the quality of the backhaul connection is initiated in the HNB or the at least one node.

52. The non-transitory computer readable medium of claim 50, wherein the at least one node comprises at least one of a Femto Gateway, a Pico Gateway, an Access Gateway, a mobility manager, or an authentication, authorization, and accounting (AAA) server.

53. The non-transitory computer readable medium of claim 50, wherein the determination of the quality of the backhaul connection is performed periodically via a keep alive mechanism.

54. The non-transitory computer readable medium of claim 50, wherein the determination of quality of the backhaul connection is performed in response to a wireless communication device requesting access to the HNB.

55. The non-transitory computer readable medium of claim 50, wherein the HNB comprises an end user device configured to communicate with a wireless communication device using a cellular technology.

56. The non-transitory computer readable medium of claim 50 further comprising code for communicating the quality of the backhaul connection to other nodes.

* * * * *